United States Patent Office
3,479,481
Patented Nov. 18, 1969

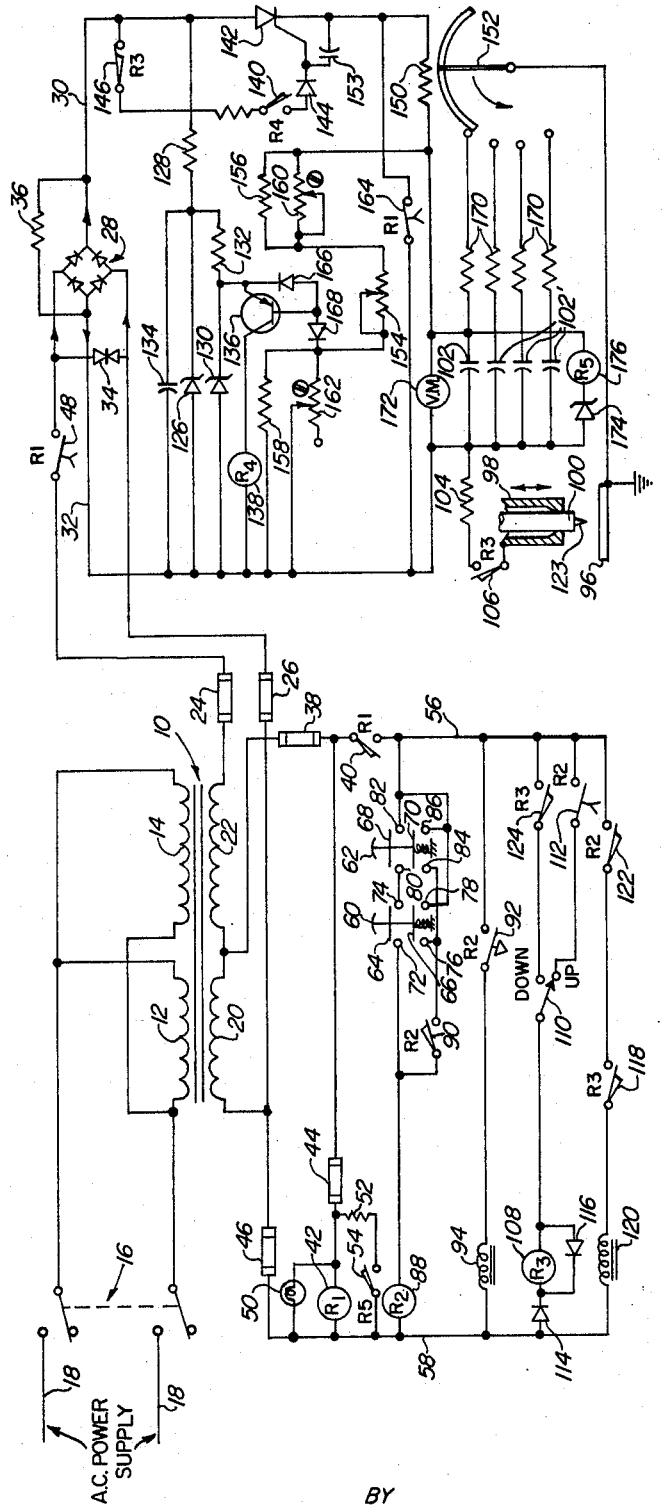

3,479,481
WELDING CIRCUIT
Johan L. Van Gulik, Lake Oswego, Oreg., assignor to Omark Industries, Inc., Portland, Oreg., a corporation of Oregon
Filed May 20, 1965, Ser. No. 457,346
Int. Cl. B23k 9/20, 9/22
U.S. Cl. 219—98                                    14 Claims

ABSTRACT OF THE DISCLOSURE

A welding circuit is described for a percussive stud welder which may be of the gravity drop type. The welding circuit includes a charging circuit for charging the welding capacitor to a predetermined voltage, a control circuit for moving the stud holder to cause a welding stud to strike a workpiece and be welded thereto after connecting such holder to the welding capacitor and clamping the workpiece, and an overvoltage protection circuit for disconnecting the welding circuit from its power supply and preventing movement of the stud holder toward the workpiece when the welding capacitor voltage exceeds a maximum value. The charging circuit disconnects the welding capacitor from its source of charging current with a silicon controlled rectifier operated by a relay which is energized by a comparator transistor connected to a reference voltage and to the capacitor voltage through a voltage divider, by switching such rectifier off when the voltage on such capacitor reaches the predetermined voltage. The overvoltage protection circuit includes a Zener diode connected in series with a relay winding across the welding capacitor to actuate the relay when the capacitor voltage exceeds the reverse breakdown voltage of the diode, thereby disconnecting the welding circuit from its power supply.

---

The subject matter of the present invention relates generally to electrical welding circuits, and in particular to a welding circuit for operating a percussion type stud welding apparatus. Briefly, the present welding circuit includes a charging circuit for charging a storage capacitor which functions as the source of welding current to a predetermined voltage which may be adjusted, and a control circuit for causing a stud holder to move a welding stud into contact with a workpiece after connecting such holder to the storage capacitor and after causing the workpiece to be clamped into position. The welding circuit of the present invention also includes an overvoltage protection circuit connected across the storage capacitor to determine if the voltage on such capacitor exceeds a predetermined value and to deactivate the welding circuit and prevent movement of the stud holder toward the workpiece when this happens. In addition, the present welding circuit also includes an actuating circuit which can only be energized to cause a weld to be made by operating both of a pair of spaced push buttons simultaneously, and must be de-energized by releasing both of such push buttons before a second weld can be formed. Both hands of the operator must be used to depress the push buttons in order to make a weld, which reduces the shock hazzard and prevents him from being injured.

The welding circuit of the present invention is especially useful in the gravity drop type of stud welding apparatus disclosed in co-pending U.S. patent application, Ser. No. 391,554, now Patent No. 3,414,699 entitled Stud Welding Apparatus, filed Aug. 24, 1964 by Albert Neumeier et al. However, the electrical circuits of the present invention can be employed for other purposes. For example, the capacitor charging circuit can be employed in an electrical pulse generator, and the overvoltage protection circuit can also be employed in such pulse generator.

The welding circuit of the present invention has several advantages over previous welding circuits including a safer, more accurate and more reliable operation of the welding apparatus automatically after the push-button starter switches are closed manually. In addition, the present welding circuit is of simple and relatively inexpensive construction, and requires little maintenance. Furthermore, the present welding circuit charges the storage capacitors providing the source of welding current to a predetermined voltage in a fast, accurate manner. Such circuit also connects the stud holder to the storage capacitors in a retracted position of such holder and discharges such capacitors through the welding stud only after such stud is moved from such retracted position toward the workpiece in order to reduce shock hazzards. In addition, this welding circuit forms stronger and more uniform welds between the stud and the stud workpiece.

Therefore, it is one object of the present invention to provide an improved electrical circuit automatically operating a welding apparatus.

Another object of the invention is to provide an improved welding circuit for controlling the operation of a percussion type stud welding apparatus in a fast, simple, accurate and reliable manner to produce stronger and more uniform welds.

A further object of the invention is to provide an improved actuating circuit for an electrical welding apparatus which requires two push-button switches to be closed simultaneously by both hands of the operator to energize such apparatus and requires both push buttons to be released to stop its operation in order to reduce shock hazzard and to prevent injury to the operator.

An additional object of the present invention is to provide an improved control circuit for a stud welding apparatus which operates automatically to connect the stud holder of such apparatus to the source of welding current only when such stud holder is in a retracted position with respect to the workpiece, to cause such stud holder to move toward such workpiece after the workpiece is clamped in a fixed position, to return the stud holder to its retracted position after removing the stud from the holder and disconnecting such holder from the source of welding current, and to then unclamp the workpiece to enable movement of such workpiece before another weld is made.

Still another object of the present invention is to provide an improved charging circuit for charging a capacitor in a fast and accurate manner to a predetermined voltage.

A still further object of the invention is to provide an improved overvoltage protection circuit for preventing a capacitor or other energy storage device from being charged above a predetermined voltage to prevent the destruction of such capacitor and other circuit components connected thereto.

Other objects and advantages of the present invention will be apparent from the following detailed description of a preferred embodiment thereof and from the attached drawing of which the figure is a schematic diagram of one embodiment of the welding circuit of the present invention.

One embodiment of the welding circuit of the present invention includes a power transformer 10 having a pair of primary windings 12 and 14 connected in parallel to the two movable contacts of a double pole, double throw line switch 16. The switch 16 has one pair of contacts connects to a pair of power lines 18 and its other pair of contacts unconnected or floating. The power transformer 10 has a pair of series connected secondary windings 20 and 22 whose opposite end terminals are connected through a pair of fuses 24 and 26 to the opposite sides of four diode bridge rectifier 28 which acts as a full wave rectifier to convert the A.C. voltage supplied from the transformer to a D.C. voltage. The output of the bridge rectifier 28 is transmitted through lines 30 and 32 to the welding capacitor charging circuit in a manner hereafter described. A thyrector diode 34 is connected across the input terminals of the bridge rectifier 28 in order to limit the transient voltage peaks applied to such bridge rectifier from the power transformer during the opening and closing of the line switch 16. In addition, a load resistor 36 is connected across the output terminals of the bridge rectifier 28 to convert the rectified current transmitted from such bridge rectifier into a rectified D.C. voltage.

The common terminal of the secondary windings 20 and 22 is connected through a fuse 38 to one contact of a pair of normally open relay contacts 40 on a first relay $R_1$ and to one terminal of the energizing winding 42 of such first relay through another fuse 44. The other terminal of the secondary winding 20 is connected to a fuse 46 to the other terminal of the main relay winding 42. Thus, if fuses 38, 44 and 46 are all intact, the current supplied from secondary winding 20 energizes the first relay winding 42 and closes contacts 40 to transmit A.C. power to the remainder of the control circuit when the line switch 16 is closed into connection with the power lines 18. In addition, the first relay $R_1$ has a second pair of normally open contacts 48 connected between the fuse 24 and the upper input terminal of the bridge rectifier 28, and such contacts are closed after a time delay when the relay winding 42 is energized to enable the bridge rectifier to supply D.C. current to charge the welding capacitors. A pilot light 50 is connected across the first relay winding 42 to indicate that the welding circuit is ready for actuation. In addition, a resistor 52 and a pair of normally open relay contacts 54 are connected in series across such first relay winding for overvoltage protection in a manner hereafter described.

The actuating circuit of the stud welding apparatus is connected between a pair of lines 56 ad 58, connected to main relay contacts 40 and fuse 46, respectively. This actuating circuit includes a pair of normally open push-button switches 60 and 62 which each have a pair of interconnected movable contacts 64–66 and 68–70, respectively, that move between two pairs of fixed contacts 72–74, 76–78 and 80–82, 84–86, respectively. The fixed contacts 78, 82 and 86 are connected in common to the line 56. Fixed contacts 74 and 80 are connected together as are fixed contacts 76 and 84. In addition, fixed contact 72 is connected through an actuating coil 88 of a second relay $R_2$ to line 58 while a pair of normally open relay contacts 90 of such second relay are connected between the relay coil and the common connection of push-button contacts 76 and 84. Thus, in order to energize the relay coil 88 of the second relay $R_2$, both push buttons 60 and 62 must be depressed in order to close the fixed contacts 80 and 82 with movable contact 68 and to close fixed contacts 72 and 74 with movable contact 64. This causes current to flow through the second relay coil 88 and closes relay contacts 90 so that current flowing either through contacts 84 and 86, closed by movable contact 70, or through contacts 76 and 78, closed by movable contact 66, will maintain the relay coil 88 energized. As a result, both push buttons 60 and 62 must be released to return the movable contacts of the push-button switches to the normally open position shown before relay coil 88 is deenergized. Thus, by requiring the release of both push buttons before the actuating coil is deenergized to enable another welding operation, it is impossible to "tie down" one push button to provide continuous operation. The push-button switches 60 and 62 are spaced far enough apart so that both hands of the operator are required to depress both of such push buttons. As a result of this and the operation of the actuating circuit, injury to the operator from electrical shock is prevented.

Another pair of normally open relay contacts 92 of the second relay $R_2$ is connected between supply lines 56 and 58 in series with a solenoid winding 94 which controls the operation of a workpiece clamp (not shown). The solenoid winding 94 may operate a valve to control the flow of fluid into a cylinder whose piston functions as the workpiece clamp in the manner shown in FIG. 3A of co-pending U.S. patent application, Ser. No. 391,554, referred to above. The relay contacts 92 are of the type which close instantaneously and reopen after a time delay so that the clamp engages the workpiece 96 before a stud holder 98 in the welding apparatus is moved down to strike the workpiece with a welding stud 100 in such holder, and holds such clamp in place for a short time after the second relay coil 88 is deenergized to enable the stud holder to be moved away from its welding position to disengage the welding stud from such stud holder after such stud has been welded to the workpiece before such clamp releases such workpiece.

The stud holder 98 is connected to one or more welding energy storage capacitors 102 through a discharging resistance 104 by means of a pair of normally open relay contacts 106 of a third relay $R_3$. The third relay is operated by energizing a coil 108 connected in series with a stud holder position limit switch 110 between supply lines 56 and 58. The stud holder limit switch 110 is normally in the "up" position shown because the stud holder 98 is held above the workpiece 96 by a fluid cylinder, not shown, in the manner described in copending application 391,554, referred to above. Thus, relay coil 108 is connected to line 56 through a pair of normally open contacts 112 of the second or actuating relay which are closed after a time delay when relay coil 88 is energized. A first diode rectifier 114 is connected between A.C. supply line 58 and relay coil 108 while a second diode rectifier 116 is connected across such relay coil in order to enable only positive rectified current to flow from line 58 through the relay coil to line 56 to actuate such coil.

When the limit switch is in the "up" position, and the relay contacts 112 of the second relay are closed, the third or welding contactor coil 108 is energized and closes contacts 106 to connect the stud holder 98 to the storage capacitors 102. This also closes another pair of relay contacts 118 on the third relay connected in series with a solenoid winding 120. The solenoid winding 120 and the relay contacts 118 are connected in series with another pair of normally open contacts 122 of the second relay which are closed by energizing of the second relay coil 88. Thus, when both of the pairs of relay contacts 122 and 118 are closed by the energization of relay coils 88 and 108, respectively, current flows through solenoid winding 120 which operates a valve controlling the cylinder (not shown) normally holding the stud holder 98 "up," to cause the stud holder to move downward to a welding position. Since the third relay coil 108 also closes contacts 106, current flows from capacitors 102 through the stud holder between the welding stud 100 and the workpiece 98 when such stud is driven into engagement with such workpiece, or immediately before such engagement due to arcing between the conical tip 123 of the stud and the workpiece, in order to weld the stud to the workpiece.

It should be noted that when the limit switch 110 is moved by the stud holder to the "down" position, the third relay coil 108 remains energized due to current flow through a pair of normally open relay contacts 124 of the third relay which are closed by the initial energization of such coil through second relay contacts 112. When the weld is completed, both of the push buttons 60 and 62 are released to deenergize the second relay coil 88, opening relay contacts 90, 92, 112 and 122. This deenergizes the stud holder solenoid winding 120 and causes the stud holder to be automatically raised to its upper position, moving the limit switch 110 back to the "up" position. When this happens, the third relay coil 108 is deenergized due to the fact that relay contacts 112 had previously been opened by the deenergization of the second relay coil 88. As a result, relay contact 106, 118 and 124 are reopened, disconnecting the stud holder 98 from the storage capacitors 192, and after a time delay, contacts 92 are reopened to deenergize the clamp solenoid 94 and release the workpiece. This completes one cycle of operation of the control circuit.

The charging circuit for the welding capacitors 102 is connected to the output terminals of the bridge rectifier 28 and includes a voltage regulator circuit formed by a first Zener diode 126 connected in series with a first current limiting resistor 128 between the D.C. supply lines 30 and 32, and a second Zener diode 130 connected in series with a second current limiting resistor 132 across the first Zener diode. Since the output voltage across a Zener diode is very nearly constant above reverse breakdown, the reference voltage obtained across the second Zener diode 130 is substantially constant and does not vary more than a few millivolts even through the input voltage varies over a wide range. A filter capacitor 134 is connected across the first Zener diode 126 in order to maintain the voltage across such Zener diode always greater than its reverse breakdown voltage even though the input signal voltage may momentarily be less than such breakdown voltage. The D.C. reference voltage produced on the cathode of the second Zener diode 130 is applied to the emitter of a comparator transistor 136 of the PNP type whose collector is connected through an actuating coil 138 of a fourth relay to the negative D.C. supply line 32.

A pair of normally open relay contacts 140 of the fourth relay are connected to the gate electrode of a silicon controlled rectifier 142 through a diode 144 to render such silicon controlled rectifier conducting when sufficient current flows through the relay coil 138 to close relay contacts 140. The anode of the silicon controlled rectifier 142 is connected to the positive D.C. voltage line 30 directly while the gate electrode of such rectified is connected to such line through a pair of normally closed relay contacts 146 of the third relay and a current limiting resistor 148, as well as the relay contacts 140 and diode 144. The cathode of the silicon controlled rectifier 142 is connected through a charging resistance 150 to the positive terminal of the main storage capacitor 102 so that when the controlled rectifier is rendered conducting, current flowing through such rectifier charges such storage capacitor, as well as any of the other storage capacitors 102' which are connected in parallel therewith by means of the movable contact of a selector switch 154 to a predetermined voltage. A bypass capacitor 153 is connected between the gate electrode and cathode of the controlled rectifier 142 in order to transmit high voltage transients around such rectifier.

The voltage to which the storage capacitors 102 are charged is determined by the setting of a variable resistor 154 which is connected as part of voltage divider network connected across such capacitors, including a pair of fixed resistors 156 and 158 in parallel with a pair of variable resistors 160 and 162, respectively. The values of the variable resistors 160 and 162 are adjusted during calibration to compensate for variations in the breakdown voltages of different diodes employed for the second Zener diode 130 so that the portion of the voltage on the storage capacitor which is applied to the base of the comparator transistor is within the proper range to be compared with the reference voltage applied to the emitter of such transistor. A pair of normally closed relay contacts 164 on the first relay are connected across the storage capacitors and the charging resistor 150 to prevent the charging of such storage capacitors until the first relay coil 42 is energized to open relay contacts 164 after a time delay.

Transistor 136 acts as a voltage comparator switch which is normally conducting because the positive reference voltage on its emitter is greater than the voltage applied to the base of such transistor by the voltage divider network including resistor 154 when the storage capacitor is in an uncharged or partially charged state. However, as the D.C. voltage on the storage capacitor 102 increases, a corresponding input signal having positive going voltage following the voltage on the capacitor is applied to the base of the comparator transistor by the voltage divider which acts as a detector of such capacitor voltage. When this input signal voltage reaches a voltage about .7 volt less than the reference voltage on the comparator transistor, such transistor becomes nonconducting. This deenergizes the fourth relay coil 138 and opens relay contacts 140 to render the silicon control rectifier 142 immediately nonconducting and stop the charging of the storage capacitor. The voltage value on the storage capacitor which causes the comparator transistor to be rendered nonconducting is determined by the setting of the variable resistor 154 in the voltage divider. A diode 166 is connected across the emitter to base junction of the comparator transistor of such a polarity that such diode is normally biased nonconducting when the transistor is conducting. This diode limits the amount of reverse bias voltage applied across the emitter to base junction of the transistor and prevents destruction of such transistor. Another diode 168 is connected between the base of the comparator transistor 136 and the variable resistor 154 in order to prevent any appreciable amount of current from flowing out of the voltage divider through diode 166 when such diode is rendered conducting. Any current flowing from the positive D.C. voltage line 30 through resistor 154, diode 166 and Zener diode 130 would increase the voltage drop across resistor 154 to produce an inaccurate comparison voltage on the base of the transistor, no longer related to the voltage on the storage capacitor, if diode 168 were not provided to prevent such current flow. It should be noted that the base current flowing in the comparator transistor is negligible.

The storage capacitors 102 are each connected through a different coupling resistor 170 to one of the fixed contacts of the selector switch 152 whose movable contact is connected to ground at the workpiece 96. As the movable contact of the selector switch is rotated in a counterclockwise direction, the secondary storage capacitors 102' are selectively connected in parallel with the main storage capacitor 102. Thus, the setting of such selector switch determines the amount of storage capacitance which is charged through resistor 150. The voltage on such storage capacitors is indicated by means of a voltmeter 172 connected across the main storage capacitor 102. It should be noted that resistors 170 enable the voltage on the storage capacitors to discharge through the stud 100 and workpiece 96 in an opposite polarity to that shown if the connections of the movable switch contact 152 and relay contact 106 are reversed to connect the stud holder to resistors 170 through such switch contact.

In addition, an overvoltage protection circuit is provided including a Zener diode 174 connected in series with the actuating coil 176 of a fifth relay across the main storage capacitor so that such diode is reversely biased by the voltage on such capacitor. The normally open contacts 54 of this relay in the control circuit are connected in series with the resistor 52, and this series circuit is connected across the first relay coil 42 and in series with fuse 44, as described previously. If the charging circuit, including the comparator transistor 138 and the controlled rectifier 142 does not operate properly, the voltage on the storage capacitors can reach a value which causes the Zener diode 174 to break down. As a result, current flows through the relay coil 176 to energize the overvoltage protection relay and close relay contacts 54. When this happens, the resistor 52 is connected in parallel with the main actuating relay coil 42 and decreases the total resistance connected in series with the fuse 42. The decreases in resistance increases the current flowing in fuse 44 above the maximum allowable current for such fuse and causes its destruction. Thus, an open circuit is formed at fuse 44, and the current flowing in the main actuating relay coil ceases, which opens relay contacts 40 and stops the operation of the welding circuit.

Of course, it is also possible to replace the fifth relay contacts 54, resistor 52 and fuse 44 with a pair of normally closed relay contacts in series with the main actuating relay coil 42 in order to deenergize such coil. However, by employing a fuse blowout to stop operation of the circuit, the operator is forced to shut down and to correct the cause of the overvoltage thereby preventing permanent damage to the remainder of the circuit. It should be noted that the storage capacitors 102 are very expensive to replace when damaged by applying too great a voltage across their end terminals, but this is prevented by the overvoltage breakdown circuit of the present invention. Also, the third relay switch contacts 146 prevent the storage capacitors from charging after the third or welding contactor relay has been energized to start the movement of the stud holder downward to a welding position and enables such capacitors to be charged only in the upper position of such stud holder when the welding contactor relay coil is deenergized.

It will be obvious to those having ordinary skill in the art that many changes may be made in the details of the above-described preferred embodiment of the present invention. For example, several interlock switches can be provided in series with the main actuating relay coil 42, and a manual or foot operated override switch may be connected in parallel with the second relay switch contacts 92 in series with the clamp solenoid in order to increase the speed of operation of the welding apparatus. Therefore, the scope of the present invention should only be determined by the following claims.

I claim:

1. A control circuit comprising:
    a pair of manual switches each having a pair of movable contacts and first and second pairs of normally open fixed contacts;
    a relay having an actuating coil and a plurality of pairs of contacts;
    means for connecting together one contact of each of the first pairs of fixed contacts of said switches and for connecting the other contacts of said first pairs of fixed contacts across a source of electrical current;
    means for connecting together one contact of each of the second pairs of fixed contacts of said switches, and for connecting together the other contact of each of said second pairs of fixed contacts;
    means for connecting said one contacts of said second pairs of fixed contacts at a first common connection to one of said other contacts of said first pairs of fixed contacts and for connecting said other contacts of said second pairs of contacts at a second common connection to the other of said other contacts of said first pair of fixed contacts; and
    means for connecting the relay coil between one terminal of the current source and said first common connection and for connecting one pair of relay contacts between one of said common connections and one of the contacts of said second pairs of contacts which is connected to said one common connection so that the relay coil is energized when both of said switches are closed and remains energized until both switches are opened.

2. A control circuit for actuating a stud welding apparatus, comprising:
    a pair of manual push-button switches each having a pair of movable contacts and first and second pairs of normally open fixed contacts, said switches being spaced a distance sufficient to prevent their simultaneous operation by one hand;
    a relay having an actuating coil and a plurality of pairs of contacts;
    means for connecting together one contact of each of the first pairs of fixed contacts of said switches and for connecting the other contacts of said first pairs of fixed contacts across a source of electrical current;
    means for connecting together one contact of each of the second pairs of fixed contacts of said switches, and for connecting together the other contact of each of said second pairs of fixed contacts;
    means for connecting said one contacts of said second pairs of fixed contacts at a first common connection to one of said other contacts of said first pairs of fixed contacts and for connecting said other contacts of said second pairs of contacts at a second common connection to the other of said other contacts of said first pair of fixed contacts; and
    means for connecting the relay coil between one terminal of the current source and said first common connection and for connecting one pair of relay contacts between one of said common connections and one of the contacts of said second pairs of contacts which is connected to said one common connection so that the relay coil is energized when both of said switches are closed and said coil remains energized until both switches are opened.

3. A welding control circuit for actuating a welding apparatus having a workpiece holder movable between normal position and a weld position comprising:
    energy storage means for supplying the welding current;
    a first relay having a plurality of pairs of normally open contacts and an actuating winding, with one of said pairs of contacts connected between said energy storage means and the workpiece holder;
    a second relay having a plurality of pairs of normally open contacts and an actuating winding;
    a source of energizing current;
    a switch connected to the winding of said first relay and having two closed positions corresponding to the normal position and the weld position of said holder, said switch being connected to said source of energizing current through another pair of contacts of said first relay in said weld position and through one pair of contacts of said second relay in said normal position; and
    means for causing said holder to move between said normal and weld positions, said means including a coil connected in series with a third pair of contacts of said first relay and another pair of contacts of said second relay across said source of energizing current.

4. A welding contactor circuit for actuating a stud welding apparatus having a welding stud holder movable between an up position and a down position comprising:
    a storage capacitor for supplying the welding current;
    a first relay having a plurality of pairs of normally open contacts and an actuating winding, with one of said pairs of contacts being welding contacts connected between said storage capacitor and the stud holder;
    a second relay having a plurality of pairs of normally open contacts and an actuating winding;
    a source of energizing current;
    a limit switch connected to the winding of said first relay and having two closed positions corresponding to the up position and the down position of said stud holder, said switch being connected to said source of energizing current through another pair of contacts of said first relay in said down position and through one pair of contacts of said second relay in said up position; and
    means for causing said stud holder to move between said up and down positions, said means including a solenoid coil connected in series with a third pair of contacts of said first relay and another pair of contacts of said second relay across said source of energizing current.

5. A capacitor charging circuit comprising:
a storage capacitor;
a charging resistance connected to said capacitor;
a D.C. voltage source of charging current;
a silicon controlled rectifier connected between said charging resistance and said voltage source;
a relay having a pair of normally open contacts connected between said voltage source and the gate electrode of said rectifier;
a voltage divider connected across said capacitor;
a comparator transistor having its base electrode connected to an intermediate terminal of said voltage divider and its collector connected to the winding of said relay;
a first diode connected between the base and the emitter electrodes of said transistor in a polarity so that said first diode is conducting when said transistor is nonconducting;
a second diode connected between said intermediate terminal of said voltage divider and the base of said transistor in a polarity opposite to that of said first diode to prevent current flowing in the voltage divider from flowing in said first diode; and
means for applying a substantially constant D.C. reference voltage to the emitter of said transistor so that said transistor is conducting as long as the voltage on said capacitor is below a predetermined value and energizes the relay winding to close the pair of relay contacts and render said rectifier conducting to transmit charging current to said capacitor until the capacitor voltage exceeds said predetermined value and renders the transistor nonconducting to deenergize the relay winding and cause the rectifier to become nonconducting.

6. A welding circuit comprising:
a storage capacitor for supplying a predetermined amount of welding current;
means for connecting one terminal of said capacitor to a workpiece to transmit said welding current through said workpiece;
a charging resistance connected to the other terminal of said capacitor;
a D.C. voltage source of charging current;
a controlled semiconductor rectifier having anode, cathode and gate electrodes, connected between said charging resistance and said voltage source so that the charging current for the storage capacitor flows through said controlled rectifier;
a first relay having a pair of normally open contacts connected between said voltage source and the gate electrode of said rectifier;
a voltage divider connected across said capacitor;
a transistor having its base electrode connected to an intermediate terminal of said voltage divider and its collector connected to the winding of said first relay;
means for applying a D.C. reference voltage to the emitter of said transistor so that said transistor is conducting as long as the voltage on said capacitor is below a predetermined value and energizes the relay winding to close the pair of relay contacts and render said rectifier conducting to transmit charging current to said capacitor until the capacitor voltage exceeds said predetermined value and renders the transistor nonconducting to deenergize the relay winding and cause the rectifier to become nonconducting;
overvoltage protection means including a reverse breakdown diode connected across said capacitor in a polarity so that the voltage on said capacitor reversely biases and said diode; and
a second relay having its actuating winding connected in series with said diode and having a pair of relay contacts connected to terminate the flow of said charging current when the voltage on said capacitor exceeds said predetermined value sufficiently to cause said diode to break down and energize the actuating winding of the second relay.

7. In a welding circuit for stud welding apparatus having a movable stud holder, an overvoltage protection circuit, comprising:
a welding capacitor;
charging means for charging said capacitor to a voltage below a predetermined voltage;
switch means for connecting said capacitor to said charging means;
actuator means for causing the stud holder to move toward a workpiece to strike the workpiece with a stud and discharge said capacitor to weld the stud to the workpiece; and
control means including a voltage sensitive switch connected across said capacitor and connected to said actuator means for controlling said switch means and said actuator means in accordance with the voltage on said capacitor so that when the capacitor voltage exceeds said predetermined voltage said voltage sensitive switch switches between nonconductive and conductive states to cause said switch means to disconnect said charging means from said capacitor and cause said actuator means to prevent movement of the stud holder toward the workpiece.

8. A circuit in accordance with claim 7 in which said control means disconnects the welding circuit from its power supply when said voltage sensitive switch switches.

9. A circuit in accordance with claim 7 in which the voltage sensitive switch is a semiconductor device and the switch means includes a relay having its actuating winding connected to the semiconductor device.

10. A circuit in accordance with claim 9 in which the semiconductor device is a reverse breakdown diode which is connected in series with the relay winding and of a polarity to be reverse biased by the voltage across the welding capacitor.

11. A capacitor charging circuit for a stud welder, comprising:
a welding capacitor;
a source of (D.C.) charging current;
switch means including a controlled semiconductor switch having an anode, a cathode and a control electrode, for connecting said capacitor to the current source so that said capacitor is charged by current flowing through said semiconductor switch;
control means connected to the control electrode of said semiconductor switch, for operating said switch;
detector means connected across said capacitor and connected to said control means, for detecting the voltage on said capacitor and for applying to said control means a corresponding input signal which varies in response to the voltage on the welding capacitor such that said control means will cause said switch means to disconnect said capacitor from said current source when the capacitor voltage reaches a predetermined voltage.

12. A circuit in accordance with claim 11 in which the detector means includes a voltage divider connected across said capacitor, a source of D.C. reference voltage and a voltage comparator device having its output connected to said control means and having one input connected to the reference voltage source and another input connected to an intermediate terminal of said voltage divider so that said comparator device applies an actuating signal to said control means when the voltage on said intermediate terminal reaches said reference voltage.

13. A circuit in accordance with claim 12 in which the semiconductor switch is a silicon controlled rectifier, the comparator device is a transistor, and the reference voltage source includes a reverse breakdown diode.

14. A circuit in accordance with claim 13 in which the control means includes a relay having its actuating winding connected to the output of said transistor and having its relay contacts connected to the gate electrode of said controlled rectifier.

References Cited

UNITED STATES PATENTS

| 2,998,561 | 8/1961 | Rockafellow | 219—113 X |
| 3,315,062 | 4/1967 | Pease | 219—98 X |
| 3,108,178 | 10/1963 | Keleman et al. | 219—113 XR |
| 3,291,958 | 12/1966 | Glorioso | 219—98 |
| 2,753,493 | 7/1956 | Saives | 317—135 |

JOSEPH V. TRUHE, Primary Examiner

M. C. FLIESLER, Assistant Examiner

U.S. Cl. X.R.

317—135; 320—1